United States Patent Office — 3,281,245 — Patented Oct. 25, 1966

3,281,245
DIAZOTYPE MATERIAL

Georg Werner, Wiesbaden-Biebrich, and Gottlieb von Poser, Wiesbaden, Germany, assignors, by mesne assignments, to Keuffel & Esser Company, Hoboken, N.J.

No Drawing. Filed Mar. 7, 1963, Ser. No. 263,400
Claims priority, application Germany, Mar. 9, 1962, K 46,130
4 Claims. (Cl. 96—91)

The present invention relates to diazotype materials and refers more particularly to diazotype materials comprising a diazonium compound having improved sensitivity to actinic radiation and improved heat stability.

Since the diazotype process first came into use there has been a constant endeavor to find new diazo compounds of greater sensitivity. This has gained greater importance in recent times because inexpensive exposure machines using low intensity fluorescent lamps have become available. Furthermore, diazotype papers requiring very short exposure times make it possible for enlargements to be made from microfilms in an acceptably short time or for prints to be produced by contact-copying from old, badly yellowed originals.

It is also important that the diazo compounds be relatively stable to heat or resist decomposition at room temperatures and that the diazotype material have a long storage life.

One object of the present invention is to provide a diazonium compound which improved sensitivity to actinic radiation and which is relatively stable to heat.

Another object is to provide a diazotype material which has greater sensitivity to actinic radiation, which is relatively stable to heat, and which has long storage life.

Other objeuts will become apparent during the course of the specification.

The present invention provides diazotype material which contains a light-sensitive diazonium salt of the formula

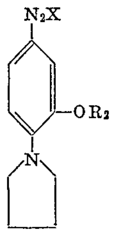

in which $R_2$ is a hydroxy alkyl group containing at least one free hydroxy group, and X is a component of a double salt.

The straight-chained or branched alkoxy group —$OR_2$ in the meta-position relative to the diazo group in the above formula may, for example, be $$—OCH_2—CH—OH \text{ or}$$
$$—OCH_2—CH_2—CH_2—OH \text{ or}$$
$$—OCH_2—CHOH—CH_3$$

Alkyl groups containing more than one free hydroxyl group also have a favorable stabilizing action on the diazo compound without affecting the light-sensitivity. Diazo compounds in which the hydroxyalkyl group $R_2$ contains up to six carbon atoms are preferably used.

The diazotype material provided by the invention has an unexpectedly long shelf life.

The diazotype material according to the invention can include a coupler so that it may be developed with ammonia.

The diazotype material according to the invention remained unchanged in most cases after three months storage under normal conditions and in the remaining cases it was found to deteriorate only slightly. Materials of excellent storage capability were obtained with a variety of different azo components, viz. dry-developed two-component diazotype papers as well as semi-wet developed one-component diazotype materials. When using a thermoplastic film as a base in a two-component diazotype material of the invention, diazotype color foils of excellent stability are obtained. By contrast, a material in which the light-sensitive diazo compound was the same except that the alkoxy group in meta posit ion to the diazo group contained no free hydroxy group, a striking deterioration of color strength was observed under the same conditions. This difference in storage stability was apparent even sooner under more severe conditions of storage, e.g. when stored at a temperature of 40° C. and a relative atmospheric humidity of 70%.

In the following examples parts by volume are cubic centimeters and parts by weight are grams.

*Example 1*

A pure white base paper suitable for diazotype purposes was coated with a solution containing 300 parts by weight of citric acid
400 parts by weight of thiourea
100 parts by weight of a mixture of naphthalene-1,3,6- and 1,3,7-trisulfonic acid sodium salts
150 parts by weight of 2-naphthol-3,6-disulfonic acid sodium salt
100 parts by weight of triethylene glycol
100 parts by weight of the zinc chloride double salt of 4-pyrrolidino-3-beta-hydroxyethoxy-benzene - diazonium chloride in 10,000 parts by volume of water and then dried. The resulting paper was given an extremely brief exposure to a master under a mercury vapor lamp and developed with ammonia vapor. It gave a blue violet image of the master on a pure white background.

The diazo compound used in this example were prepared as follows:

522 parts by weight (3 mol) of 2-chloro-5-nitro-1-phenol was dissolved in 600 parts by volume of ethanol and heated to boiling under reflux with stirring. Five successive additions of 300 parts by volume of sodium hydroxide (containing 20 parts by weight of NaOH per 100 parts by volume of solution) and 120 parts by volume of beta-chloro-ethyl alcohol were made. The additions were simultaneously introduced from two separate tubes and stirring was continued while boiling for half an hour in the case of the first four additions and for one and a half hours in the case of the last addition. The hot solution was then poured with stirring into 3000 parts by volume of iced water, whereupon 2-chloro-5-nitrophenol (beta-hydroxyethyl ether) precipitated out. This compound was filtered off, washed neutral with water and then recrystallized from 900 parts by volume of ethanol. The yield was 550 parts by weight (84% of the theoretical yield) in the form of white crystals having a melting point of 116° to 117° C.

545 parts by weight of the 2-chloro-5-nitro-phenol (beta-hydroxyethyl ether) and 2750 parts by volume of pyrrolidine were boiled for 8 hours under reflux and the solution was then poured into 5 parts by volume of ice water. An orange red reaction product was filtered off and washed until neutral. It was recrystallized from 1250 parts by volume of ethanol. Its melting point was 120° to 121° C.

504 parts by weight of the reaction product, N-(4-nitro-2-beta-hydroxy-ethoxy-phenyl)-pyrrolidine, were reduced in 8000 parts by volume of 15% hydrochloric acid by the fractionwise introduction of 800 parts by weight of zinc dust until the solution became completely colorless. The temperature rose to 75° C. 30 parts by weight of Carboraffin (activated charcoal) were added and the solution filtered. The filtrate was cooled and after 400 parts by volume of 30% hydrochloric acid with 1000 parts by volume of 2 N sodium nitrite solution were slowly added with stirring at 5° to 10° C., diazotization was accomplished. 1800 parts by volume of sodium chloride were sprinkled in to precipitate the zinc chloride double salt of 4-pyrrolidino-3-beta-hydroxy-ethoxy-benzene diazonium chloride. The precipitate was purified by dissolving it in 5500 parts by volume of water, 50 parts by weight of Carboraffin were then added and, after filtration, the double salt was precipitated by addition of 1.1 parts by weight of sodium chloride. It was obtained in the form of fine yellowish crystals.

*Example 2*

Paper was coated with a solution containing 300 parts by weight of citric acid
400 parts by weight of thiourea
50 parts by weight of a mixture of naphthalene-1,3,6- and 1,3,7-trisulfonic acid sodium salts
100 parts by weight of diresorcinol (2,4, 2',4')
120 parts by weight of the tin chloride double salt of 4-pyrrolidino-3-beta-hydroxy-propoxy benzene diazonium chloride in 10,000 parts by volume of water and then dried. This diazotype paper, after imagewise exposure to a mercury vapor lamp and development with ammonia vapor, gave yellow-brown prints.

When the above solution was applied to a suitable transparent support, e.g. a superficially lacquered transparent paper, a material suitable for the preparation of intermediate originals with good covering power was obtained.

The salt was prepared like that of Example 1 as follows:

87 parts by weight of 2-chloro-5-nitro-1-phenol were dissolved in 200 parts by volume of ethanol. 142 parts by weight of 1-chloro-propanol- (2) were added and the mixture heated to boiling under reflux. Over a period of one hour 200 parts by volume of sodium hydroxide (containing 20 parts by weight of NaOH per 100 parts by volume) were introduced dropwise into the boiling solution which was further boiled for 3 hours. The reaction mixture was diluted with 1250 parts by volume of water, whereupon 2-chloro-5-nitro-phenol-(beta-hydroxy-propyl-ether) precipitated out. The precipitate was filtered off, washed with iced water and recrystallized from 3500 parts by volume of water. 89 parts by weight, (i.e. 77% of the theoretical yield) of the product were recovered. The melting point of the product was 60°–63° C.

The product was converted into N-(4-nitro-2-beta-hydroxy-propoxy-phenyl)-pyrrolidine in the form of yellow crystals by boiling for 8½ hours with pyrrolidine and recrystallizing from ethanol. The melting point of this pyrrolidine derivative was 100.5 to 102° C. It was catalytically reduced in an autoclave with hydrogen and a nickel catalyst to yield the crystalline base N-(4-amino-2-beta-hydroxy-propoxy-phenyl)-pyrrolidine.

19 parts by weight of this product were diazotized in 80 parts by volume of 15% hydrochloric acid with 32 parts by volume of 2 N sodium nitrite solution at 5° to 10° C. The resulting solution was clarified by charcoal filtration and the diazo compound precipitated by the addition of sodium chloride and 50% (by weight) tin chloride solution. It was filtered off and dissolved in 600 parts by volume of water, freed of impurities by the addition of Carboraffin to the solution followed by filtration and precipitated from the filtrate with sodium chloride and tin chloride solution. 11.5 parts by weight of the tin chloride double salt of 4-pyrrolidino-3-beta-hydroxy-propoxy-benzene diazonium chloride were obtained in the form of fine, brown crystals.

*Example 3*

Paper was coated with a solution containing 300 parts by weight of citric acid
300 parts by weight of thiourea
25 parts by weight of a mixture of naphthalene-1,3,6 and 1,3,7-trisulfonic acid sodium salts
70 parts by weight of beta-hydroxynaphthoic acid ethanolamide
100 parts by weight of the diazo compound used in Example 2 in 10,000 parts by volume of water and then dried. A highly light-sensitive paper was produced. Development with ammonia vapor gave pure blue images. The paper was very suitable for the production of direct enlargements from microfilms.

*Example 4*

Paper was coated with a solution containing 400 parts by weight of citric acid
400 parts by weight of thiourea
150 parts by weight of a mixture of naphthalene-1,3,6 and 1,3,7-trisulfonic acid sodium salts
150 parts by weight of diresorcinol sulfide (2,4, 2',4')
200 parts by weight of the tin chloride double salt of 4-pyrrolidino-3-beta, gamma-dihydroxy-propoxy-benzene diazonium chloride in 10,000 parts by volume of water and dried. A diazotype paper was obtained which after extremely brief exposure followed by development with gaseous ammonia gave a yellow brown image.

The diazonium salt used in this example was prepared like those used in the preceding examples as follows:

87 parts by weight of 2-chloro-5-nitro-phenol were dissolved in 200 parts by volume of ethanol. 165.8 parts by weight of 3-chloro-1,2-propanediol were added to the solution. The mixture was heated to boiling under reflux and 200 parts by volume of sodium hydroxide (containing 20 parts by weight of NaOH per 100 parts by volume) were introduced dropwise over a period of one hour. Boiling under reflux was then continued for 2 hours. The reaction mixture was cooled and 2-chloro-5-nitro-phenol-(beta,gamma-dihydroxy-propyl)ether precipitated out in the form of yellowish crystals. The precipitate was filtered off, washed neutral and then recrystallized from 50% ethanol. It was obtained in an 82% yield in the form of fine, ivory crystals with a melting point of 78° to 80° C.

24.8 parts by weight of the reaction product were boiled under reflux with 125 parts by volume of pyrrolidine for 8 hours. When the reaction was completed, the resultant N- (4-nitro-2-beta; gamma-dihydroxy-propoxy-phenyl)-pyrrolidine was precipitated with water. It was filtered off, washed neutral and recrystallized from 400 parts by volume of ethanol. It precipitated out in the form of golden yellow crystals which were completely free of chlorine. This was essential for further processing. The yield was 73% of the theoretical; the melting point was 158 to 159° C.

The nitro compound was reduced catalytically by heating 14 parts by weight of the nitro compound to 90° C. in an autoclave with 200 parts by volume of ethanol and 30 parts by volume of an alcoholic suspension of nickel under a presure of 80 atmospheres of hydrogen, until hydrogen addition ceased. When the solution was separated from the nickel by filtration and the ethanol distilled off, the base was obtained in the form of a dark violet crystalline mass.

12 parts by weight of the base were dissolved in 50 parts by volume of 15% hydrochloric acid. The solution was cooled and then diazotized with 20 parts by volume of 2 N sodium nitrite solution, which was added slowly. After filtration over Carboraffin the diazo compound was precipitated with 50% tin chloride solution and sodium chloride. It was purified by recrystallization from water. 8.5 g. of the tin chloride double salt of 4-pyrrolidino - 3 - (beta,gamma-dihydroxy propoxy)-benzene diazonium chloride were obtained.

It is apparent that the described examples are capable of many variations and modifications within the scope of the present invention. All such variations and modifications are to be included within the scope of the present invention.

What is claimed is:

1. A diazotype material having improved light-sensitivity, heat-stability, and storage life comprising a support and a light-sensitive layer coated on said support, said layer comprising a diazonium salt having the general formula:

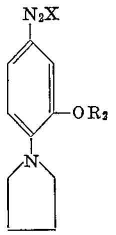

$R_2$ is an hydroxy alkyl group containing up to six carbon atoms and at least one free hydroxyl group; and X is a component of a double salt.

2. A material in accordance with claim 1 in which said diazonium salt is the zinc chloride double salt of 4-pyrrolidino-3-hydroxyethoxy benzene diazonium chloride.

3. A material in accordance with claim 1 in which said diazonium salt is the tin chloride double salt of 4-pyrrolidino-3-(beta-hydroxy propoxy) benzene diazonium chloride.

4. A material in accordance with claim 1 in which said diazonium salt is the tin chloride double salt of 4-pyrrolidino-3-(beta,gamma-dihydroxy propoxy) benzene diazonium chloride.

References Cited by the Examiner

UNITED STATES PATENTS

| | | | |
|---|---|---|---|
| 2,350,843 | 8/1943 | Vanselow et al. | 96—91 |
| 2,851,452 | 9/1958 | Breig et al. | 260—140 |
| 2,948,613 | 8/1960 | Cox | 96—91 |
| 3,028,240 | 4/1962 | Werner et al. | 96—91 |
| 3,117,954 | 1/1964 | Hupfer | 260—141 |

FOREIGN PATENTS 853,020 11/1960 Great Britain.

OTHER REFERENCES

Leigh et al., J. Am. Chem. Soc., vol. 76, pp. 5144–46 (1954).

NORMAN G. TORCHIN, *Primary Examiner.*

NICHOLAS S. RIZZO, ALEXANDER D. RICCI, *Examiners.*

J. TOVAR, C. BOWERS, *Assistant Examiners.*